(12) United States Patent
Cain et al.

(10) Patent No.: US 6,401,747 B1
(45) Date of Patent: Jun. 11, 2002

(54) GATE VALVE

(75) Inventors: David E. Cain, Houston; Gregory L. Glidden, Spring; Taylor L. Jones, Houston, all of TX (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/615,170

(22) Filed: Jul. 13, 2000

(51) Int. Cl.[7] ................................................. F16K 3/02
(52) U.S. Cl. .................. 137/329.03; 137/797; 251/266; 251/327
(58) Field of Search .................... 137/329.02, 329.03, 137/797; 251/266, 327

(56) References Cited

U.S. PATENT DOCUMENTS

| | | | | |
|---|---|---|---|---|
| 3,434,692 A | * | 3/1969 | Tillman | 251/327 X |
| 3,472,427 A | * | 10/1969 | Schaefer | 137/797 X |
| 3,614,061 A | * | 10/1971 | Fitzpatrick | 251/327 |
| 3,662,778 A | | 5/1972 | Leopold, Jr. et al. | |
| 3,889,925 A | * | 6/1975 | Brooks | 251/327 |
| 4,376,524 A | * | 3/1983 | Shelton | 251/327 X |
| 4,433,827 A | * | 2/1984 | Redmon et al. | 251/266 X |
| 4,440,381 A | * | 4/1984 | Tipton | 251/327 X |
| 4,486,003 A | | 12/1984 | Meyer et al. | |
| 4,645,179 A | * | 2/1987 | Ali | 137/329.02 X |
| 4,651,973 A | * | 3/1987 | Oliver | 251/327 X |
| 4,658,848 A | | 4/1987 | Meyer et al. | |
| 4,971,098 A | * | 11/1990 | Stroud | 251/327 X |
| 5,029,812 A | | 7/1991 | Haynes | |
| 5,732,731 A | | 3/1998 | Wafer | |
| 5,762,320 A | | 6/1998 | Williams et al. | |
| 5,803,431 A | | 9/1998 | Hoang et al. | |

FOREIGN PATENT DOCUMENTS

GB      2100843 A      1/1983

* cited by examiner

*Primary Examiner*—Gerald A. Michalsky
(74) *Attorney, Agent, or Firm*—Henry C. Query, Jr.

(57) ABSTRACT

The present invention is directed to a gate valve which in one embodiment comprises a valve body having an internal flow passage which extends between an inlet port and an outlet port; a pair of seats mounted in respective seat pockets formed in the body coaxial with the flow passage; a gate disposed between the seats and having a transverse opening therethrough; and a valve stem threadedly connected to the gate; wherein rotation of the valve stem raises or lowers the gate to bring the opening into or out of alignment with the flow passage to either open or close the gate valve, respectively; and wherein each seat comprises a generally cylindrical body portion having a substantially uniform outer diameter and first and second end faces which are adapted to seal with the gate; whereby each seat may be mounted in its seat pocket with either the first face or the second face adjacent the gate.

18 Claims, 4 Drawing Sheets

GATE VALVE

BACKGROUND OF THE INVENTION

The present invention relates to a gate valve. More particularly, the invention relates to a gate valve which comprises a number of features which contribute to a reduction in the weight and manufacturing cost of the gate valve.

Prior art gate valves, especially those used in the oil and gas industry, typically comprise a valve body, a flow passage extending axially through the body between an inlet port and an outlet port, a gate cavity extending partially through the body generally transverse to the flow passage, and a bonnet mounted to the body over the gate cavity. A valve stem is rotationally supported in the bonnet or in a bonnet cap secured to the top of the bonnet. One end of the valve stem is connected to a handle or other means for rotating the valve stem, and the other end of the valve stem is threaded into a gate which is disposed between a pair of seats that are mounted in the flow passage. Each seat comprises a through bore which is concentric with the flow passage, and the gate includes a transverse opening extending therethrough. In operation, the stem is rotated to raise or lower the gate and bring the opening into or out of alignment with the through bores to either open or close the flow passage, respectively.

In the closed position of such prior art gate valves, the gate will typically seal against the downstream seat, and the upstream pressure will be contained within the valve body by both this gate-to-seat seal and by an annular sealing member disposed between the valve stem and the bonnet. The front face of each seat is usually specially machined or treated to ensure an effective metal-to-metal seal with the gate, and the back face of the seat is often designed to accommodate an additional backup seal with the valve body. Thus, these seats require multiple, time consuming machining steps. Additionally,.these seats are asymmetrical and can only be mounted in the gate valve in a specific orientation.

The valve stem sealing member of prior art gate valves is typically a stem packing which is comprised of many individual sealing elements. Such stem packings are relatively expensive and contribute to the overall complexity of the gate valve. In addition, the stem packing is usually secured within the bonnet by a retainer which is threaded into the bonnet. While this retainer is effective to transmit the upward force acting on the seal to the bonnet, the threaded connection between the retainer and the bonnet is time consuming and costly to manufacture.

In many prior art gate valves, the stem is connected to the gate with an acme thread. Although this is a robust connection, the process of machining the acme threads on the stem and the gate is expensive. Also, in order to permit the gate to float toward the downstream seat when the gate valve is closed, the stem is usually threaded into a lift nut which is loosely retained in the gate. This lift nut necessarily increases the cost and complexity of such gate valves.

In high pressure applications, considerable upward thrust is imparted on the valve stem. Thus, prior art gate valves often comprise one or more metallic thrust bearings, such as needle bearings, connected between the stem and the bonnet cap to transfer the thrust load to the bonnet and thereby lower the operating torque of the gate valve. These metallic thrust bearings are relatively expensive and add to the overall weight of the gate valve. In addition, these metallic thrust bearings periodically require lubrication during the life of the gate valve and are also subject to rusting.

Furthermore, in many prior art gate valves the gate cavity comprises a bore having a uniform cross section in the plane perpendicular to the valve stem. However, this cross sectional area is usually larger than is required to accommodate the gate below the flow passage. Therefore, these prior art gate valves are constructed with bodies which are larger than required, and this needlessly increases the cost and weight of the gate valve.

SUMMARY OF THE INVENTION

These and other disadvantages in the prior art are overcome by providing a gate valve comprising a valve body having an internal flow passage which extends between an inlet port and an outlet port, a pair of seats mounted in respective seat pockets formed in the body coaxial with the flow passage, a gate disposed between the seats and having a transverse opening therethrough, and a valve stem threadedly connected to the gate, wherein rotation of the valve stem raises or lowers the gate to bring the opening into or out of alignment with the flow passage to either open or close the gate valve, respectively, and wherein each seat comprises a generally cylindrical body portion having a substantially uniform outer diameter and first and second end faces which are adapted to seal with the gate, whereby each seat may be mounted in its seat pocket with either the first face or the second face adjacent the gate.

In accordance with another embodiment of the invention, the gate valve comprises a gate cavity extending through the valve body and intersecting the flow passage, a bonnet connected to the valve body over the gate cavity, the bonnet having a bore extending therethrough which communicates with the gate cavity, a bonnet cap secured to the bonnet over the bore, the valve stem comprising a first portion which is rotationally supported in the bonnet cap and a second portion which extends through the bore in the bonnet and into the gate cavity, an annular sealing member disposed between the valve stem and the bonnet bore, and a retainer for restricting axial movement of the sealing member within the bore. The retainer comprises a radial flange which is secured between the bonnet and the bonnet cap, such that axial forces exerted on the retainer by the sealing member are transmitted to the bonnet cap via the flange and without the need for a threaded connection between the retainer and the bonnet.

In accordance with another embodiment of the invention, the second portion of the valve stem is provided with "V" threads that are adapted to engage corresponding "V" threads formed in a longitudinal hole extending into the gate from a top surface thereof. The "V" thread interface created by these "V" threads converts the rotation of the stem into translation of the gate. In addition, the "V" thread interface between the stem and the gate is preferably sufficiently loose to allow the gate to float laterally to engage the downstream seat when the gate valve is in the closed position.

In accordance with yet another embodiment of the present invention, the gate valve comprises a bearing support ring which is rotationally received within the bonnet cap and includes an axial bore through which the first portion of the valve stem is inserted, a bearing pin for securing the bearing support ring to the stem, and a preferably non-metallic thrust bearing washer which is disposed between the bearing support ring and the bonnet cap. The bearing support ring, bearing pin and thrust bearing washer comprise an inexpensive, lightweight assembly that effectively transmits the thrust from the valve stem to the bonnet. In addition, the non-metallic thrust bearing washer will not rust and does not require the application of lubrication during the life of the gate valve.

In accordance with still another embodiment of the invention, the gate cavity comprises a first chamber located below the flow passage and a second chamber located above the flow passage, and the cross sectional area of the first chamber in a plane perpendicular to the valve stem is less than the cross sectional area of the second chamber in a plane perpendicular to the valve stem. Thus, the size of the valve body below the flow passage is minimized to reduce the overall weight and cost of the gate valve, as well as reduce the volume of trapped pressure in the gate valve that contributes to problems with blow down when the gate is opened. In addition, the wall sections of the valve body preferably comprise a generally uniform thickness to improve casting flow during manufacture of the gate valve.

These and other objects and advantages of the present invention will be made apparent from the following detailed description, with reference to the accompanying drawings.

DETAILED DESCRIPTION OF THE PREFERRED EMBODIMENTS

Figure 1:
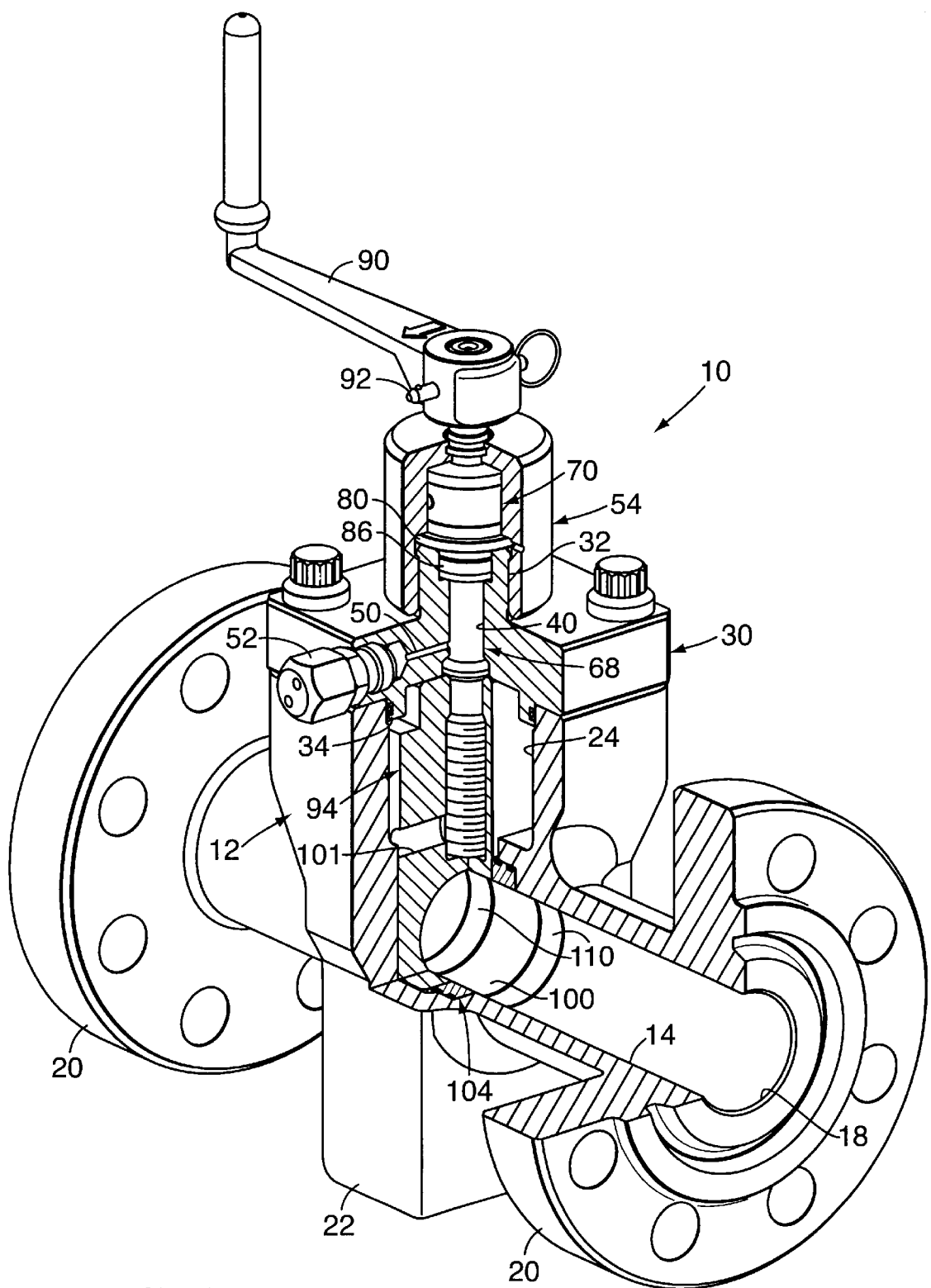
FIG. 1 is a perspective, partial sectional view of the gate valve of the present invention.
Figure 2:
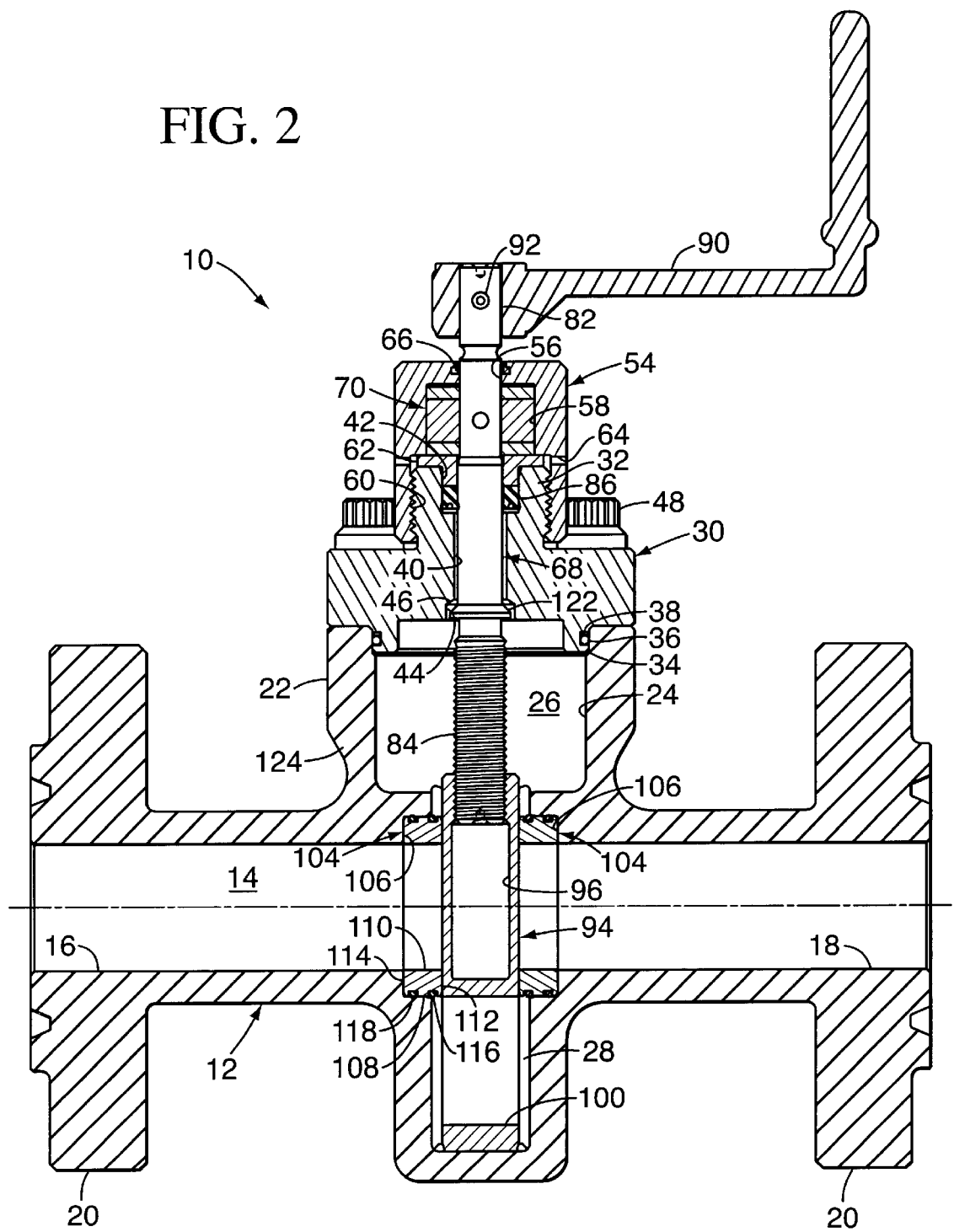
FIG. 2 is a longitudinal cross sectional view of the gate valve shown in FIG. 1.
Figure 3:
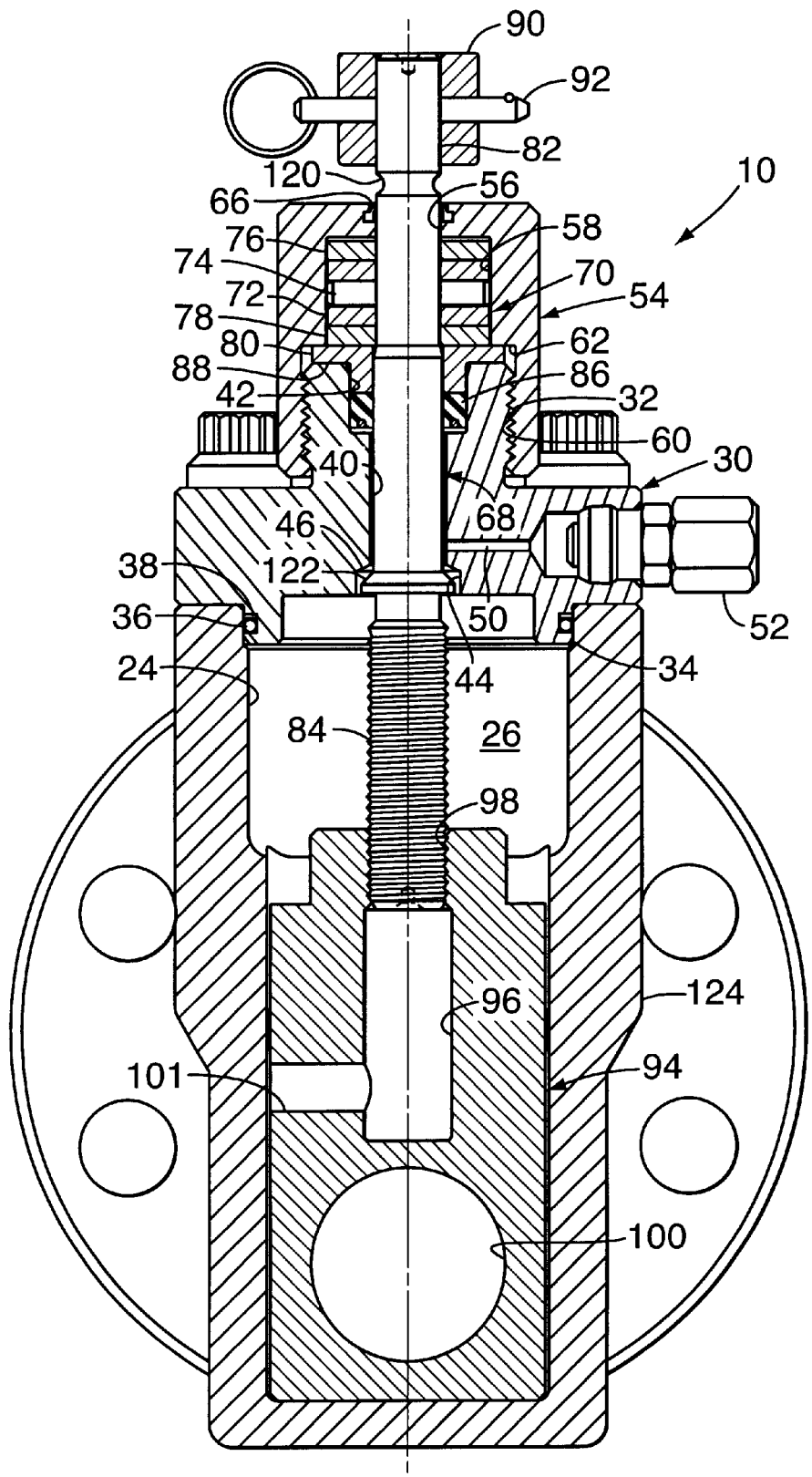
FIG. 3 is a lateral cross sectional view of the gate valve shown in FIG. 1.

Referring to FIGS. 1–3, the gate valve of the present invention, which is indicated generally by reference number 10, is shown to comprise a valve body 12 having an internal flow passage 14 extending therethrough between an inlet port 16 and an outlet port 18. The gate valve may also include suitable connectors, such as flanges 20, to connect the inlet and outlet ports of the gate valve 10 to exterior flow pipes (not shown). The valve body 12 comprises a central portion 22 which houses a gate cavity 24 that extends partially through the valve body generally perpendicular to the flow passage 14. The gate cavity 24 includes an upper, generally cylindrical chamber 26 located above the flow passage 14 and a lower, generally rectangular chamber 28 located below the flow passage. The body 12, including the flanges 20 and the central portion 22, is preferably cast as a single piece from a high strength material, such as steel.

The gate valve 10 also comprises a valve bonnet 30 which is mounted to the valve body 12 over the gate cavity 24. The bonnet 30 includes an upper neck 32 and a lower annular flange 34 which is tightly received in the top of the gate cavity 24. A suitable annular sealing member 36, such as a metallic or non-metallic O-ring, is positioned in a corresponding groove in the flange 34 to seal between the bonnet 30 and the valve body 12. A non-extrusion ring 38 may also be provided in the groove above the sealing member 36 to prevent the sealing member from being forced out of the groove under high pressure. The bonnet 30 also comprises a bore 40 which extends therethrough and communicates with the gate cavity 24. The bore 40 includes an enlarged diameter portion 42 formed at the upper end of the neck 32 and a counterbore 44 defining a conical backseat 46 formed at the lower end of the bonnet 30. The bonnet 30 is preferably removably secured to the valve body 12 such as by a plurality of cap screws or bolts 48. In addition, the bonnet 30 may also comprise a pressure bleeder port 50 which has one end connected to the bore 40 and the other end sealed by a bleeder plug 52.

It should be noted that the flange 34 comprises a generally vertical outer diameter surface which engages the gate cavity 24 radially inwardly of the generally horizontal interface between the bonnet 30 and the body 12. The positioning of the seal 36 between the flange 34 and the gate cavity 24, as opposed to the horizontal interface between the bonnet 30 and the body 12, thus minimizes the area of the bonnet which is subject to the pressure within the gate cavity 24. Consequently, the force which the pressure exerts on the bonnet is minimized, and relatively small cap screws or bolts 48 may therefore be used to secure the bonnet to the body.

The gate valve 10 also includes a bonnet cap 54 which is connected to the bonnet 30 over the neck 32. The bonnet cap 54 comprises an upper aperture 56 that communicates with an annular socket 58. The socket 58 includes an enlarged diameter lower portion 60 which defines a step 62. The bonnet cap 54 is preferably secured to the bonnet 30 by a threaded connection between the neck 32 and the lower portion 60 of the socket 58. The bonnet cap may also include a pressure vent port 64 and a wiper ring seal 66 disposed in the aperture 56.

The gate valve of the present invention also comprises a valve stem 68 which is rotationally supported in the bonnet cap 54. The valve stem 68 extends through the aperture 56 in the bonnet cap and is connected to a thrust bearing assembly 70 which in turn is received in the socket 58 of the bonnet cap. Referring specifically to FIG. 3, the thrust bearing assembly 70 includes a bearing support ring 72 which comprises an axial hole through which the valve stem 68 is inserted. The valve stem 68 is connected to the bearing support ring 72 by a bearing pin 74 which is inserted through corresponding lateral holes in the valve stem and the bearing support ring. The bearing support ring 72 is rotationally disposed between upper and lower thrust bearing washers 76, 78. The entire thrust bearing assembly 70 is supported within the socket 58 on a retainer 80. Thus, the thrust bearing assembly 70 functions to rotationally support the valve stem 68 within the bonnet cap 54 and also transmit the upward axial thrust acting on the valve stem to the bonnet cap 54. In the preferred embodiment of the invention, the bearing support ring 72 and the bearing pin 74 are made of a strong, preferably metallic material. Also, the upper and lower thrust bearing washers 76, 78 are ideally made of a strong, corrosion resistant material which does not require the application of a lubricant to maintain suitable performance. Preferably, the upper and lower thrust bearing washers 76, 78 are made of a non-metallic material such as carbon filled Teflon®, PTFE or fiberglass. However, the upper and lower thrust bearing washers 76, 78 may be constructed of a metallic material with a high lubricity, for example, beryllium copper, brass, aluminum bronze, or a sintered metal such as bronze or brass which is impregnated with oil.

The valve stem 68 extends through the bore 40 in the bonnet 30 and includes an upper end 82 which protrudes through the aperture 56 in the bonnet cap 54 and a lower end 84 which extends into the gate cavity 24. An annular stem sealing member 86 is disposed around the valve stem 68 within the enlarged diameter portion 42 of the bore 40 to seal between the valve stem and the bonnet 30. The sealing member 86 is preferably a single lip seal constructed of a non-metallic material such as PTFE, plastic or rubber. The lip seal comprises a first annular sealing lip for engaging the valve stem, a second annular sealing lip for engaging the bore, and a metallic spring member for urging the first and second sealing lips into engagement with the valve stem and the bore, respectively. The sealing member 86 is held within the enlarged diameter portion 42 by the retainer 80. The retainer 80 includes a radially extending flange 88 which is trapped between the top of the bonnet 30 and the step 62 of the bonnet cap 54 to thereby restrict axial movement of the retainer 80 relative to the bonnet 30. In this manner, pressure within the gate cavity 24 will force the sealing member 86 against the retainer 80, and this load will be transmitted directly to the bonnet cap 54 and not to the thrust support assembly 70, which consequently reduces the operating torque of the gate valve. The valve stem 68 may be rotated manually using a handle 90 which is connected to the upper end 82 by a quick disconnect pin 92 or any other suitable means. Of course, any desired means may be employed to rotate the stem 68, including any manual or powered means currently in use for such a purpose.

The gate valve 10 also includes a generally rectangular gate 94 which is positioned in the gate cavity 24 across the flow passage 14. The gate 94 comprises a central longitudinal hole 96 extending through its top surface. The hole 96 includes a threaded upper portion 98 into which the lower end 84 of the valve stem 68 is threadedly received. As shown more clearly in FIG. 1, substantially the entire lower end 84 of the valve stem 68 is threaded. Thus, when the valve stem 68 is rotated, the gate 94 will move axially up or down with respect to the valve stem 68. The threads on the lower end 84 and in the threaded portion 98 of the hole 96 preferably comprise a "V" profile, which is simpler and less costly to manufacture than the typical acme thread. In addition, the fit between the lower end 84 and the upper portion 98 is sufficiently loose to allow the gate 94 to float slightly in the direction of the pressure in the flow passage 14, the purpose of which will be described below. The gate 94 also comprises a transverse opening 100 having a centerline that is parallel with the flow passage 14. In addition, the gate 94 may include a lateral bore 101 to allow the longitudinal hole 96 to evacuate when the valve stem 68 is threaded therein.

Figure 4:
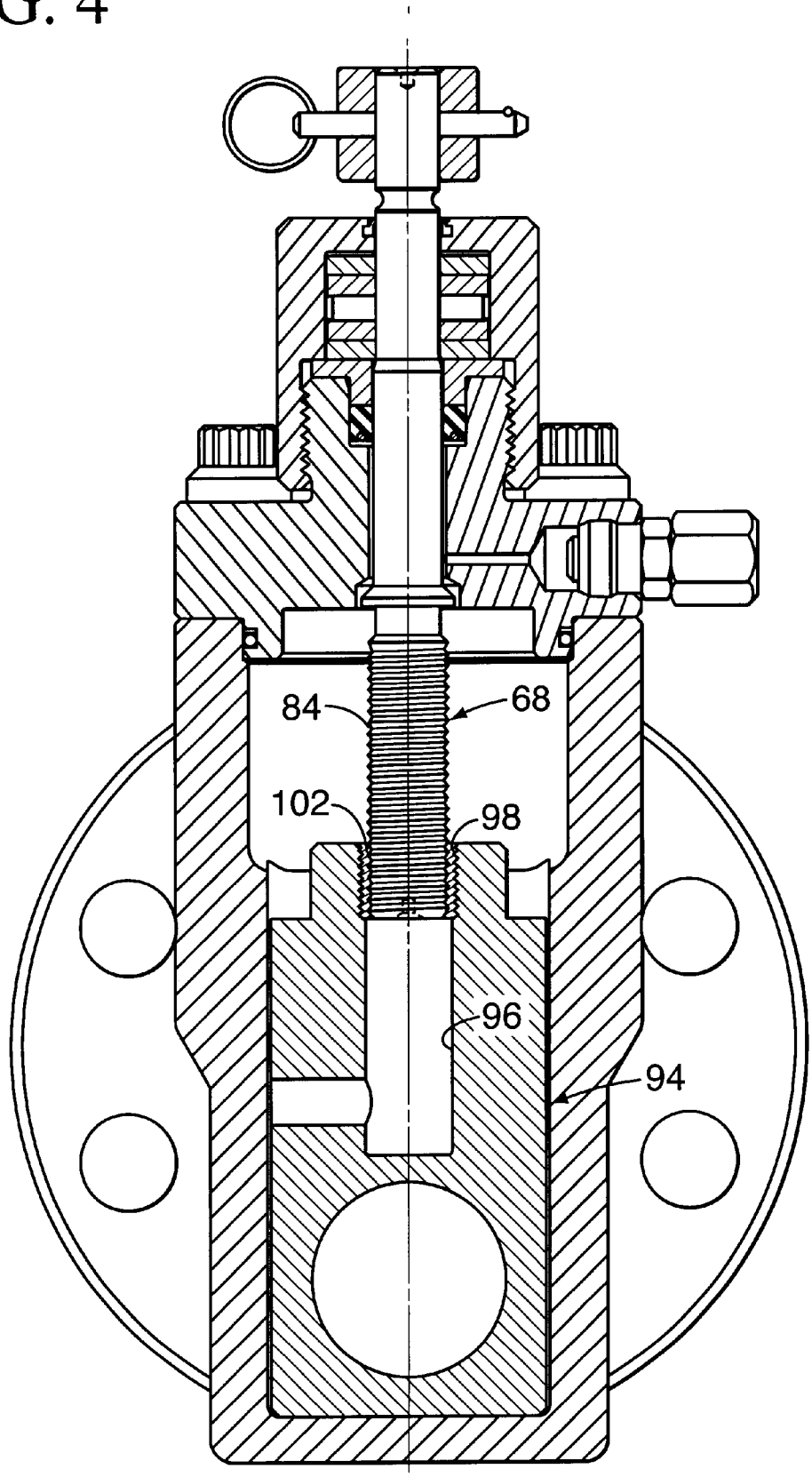
FIG. 4 is a lateral cross sectional view of another embodiment of the gate valve of the present invention.

In accordance with an alternative embodiment of the invention, which is shown in FIG. 4, a threaded insert 102 is installed in the threaded upper portion 98 of the longitudinal hole 96, and the lower end 84 of the valve stem 68 is threaded into the insert 102. Thus, rather than having to drill the upper portion 98 and then undercut the remainder of the hole 96 to accommodate the lower threaded end 84 of the stem, as is required in the previous embodiment, the threaded insert 102 allows the upper portion 98 to be formed as a simple counterbore in the hole 96. The threaded insert comprises a through bore which preferably includes a "V" thread formed therein. The threaded insert may be of any conventional type, such as a low friction bushing or a spring bushing. The threaded insert 102 thus provides a simple, inexpensive interface between the valve stem 68 and the gate 94.

Referring again to FIG. 2, the gate 94 is slidably disposed between a pair of seats 104, each of which is mounted in a respective seat pocket 106 formed in the valve body 12 coaxial with the flow passage 14. Each seat 104 comprises a cylindrical body portion 108 having a uniform outer diameter, an axial through bore 110 and first and second end faces 112, 114. The through bore 110 is concentric with the flow passage 14, and each end face 112, 114 is specially treated or machined, such as by lapping, to form a metal-to-metal seal with the gate 94. Each seat 104 also comprises first and second annular grooves 116, 118 formed on the outer diameter of the body portion 108. The first groove 116 is located somewhat adjacent the first end face 112, and the second groove 118 is located somewhat adjacent the second end face 114. The axial length of each seat and the locations of the grooves are selected such that, when the seat is mounted in the pocket 106, only one groove will be positioned in the pocket. Thus, the other groove may be used to pry the seat out of the pocket during maintenance operations. In the preferred embodiment of the invention, the grooves 116, 118 are symmetrical on the body portion 108. Thus, each seat 108 is preferably symmetrical and can be mounted in the pocket 106 with either the first end face 112 or the second end face 114 adjacent the gate 94. An annular sealing member, such as a non-metallic O-ring, is disposed in the groove which is positioned in the pocket 106 to seal between the seat 104 and the valve body 12. In addition, a backup seal is preferably formed between the seat pocket 106 and the end face 112, 114 which is not positioned adjacent the gate 94.

In the closed position of the gate valve 10, which is shown in FIGS. 2 and 3, the opening 100 in the gate 94 is offset from the through bores 110 in the seats 104, and the flow passage 14 is consequently closed. Pressure in the flow passage 14 upstream of the floating gate 94 will force the gate against the downstream seat 104. This pressure will be contained in the gate cavity 24 by the gate-to-seat seal formed between the gate and the downstream seat, by the stem sealing member 86, and by the sealing member disposed between the seat and the valve body 12 in one of the grooves 116, 118. In addition, the end face of the downstream seat 104 will seal against the bottom of the seat pocket 106 to form a backup to the sealing member disposed between the seat and the valve body. Since the gate 94 is permitted to float in the direction of the pressure in the flow passage 14, the gate valve 10 is capable of sealing from either direction. Thus, the gate valve 10 is bi-directional. To open the gate valve 10, the handle 90 is rotated to bring the opening 100 into alignment with the through bores 110 and thereby open the flow passage 14, as shown in FIG. 1.

Referring again to FIG. 3, in a preferred embodiment of the invention, the valve stem 68 comprises a reduced diameter notch 120 formed near the upper end 82 in a portion of the valve stem located outside the bonnet cap 54. The notch 120 is designed to fail before any other portion of the valve stem 68 when the valve stem is subject to a maximum torque, that is, a torque which will cause the valve stem to break. Thus, if the valve stem should break under the maximum applied torque, it will most likely break at the notch 120. This will ensure that the valve stem does not break below the stem sealing member 86, which would likely result in pressure escaping from the gate cavity 24 through the bonnet 30, which pressure could propel the broken portion of the valve stem and the handle into the operator.

In addition, the valve stem 68 may also include a conical sealing shoulder 122 formed integrally with the valve stem adjacent the backseat 46 in the bonnet 30. With the gate valve 10 in the closed position, the bottom surface of the gate 94 will engage the bottom of the gate cavity 24. Further rotation of the valve stem 68 in the direction of closing will cause the stem to rise relative to the gate and force the shoulder 122 against the backseat 46. The shoulder and the backseat will thereby form a seal which is sufficient to contain the pressure within the gate cavity 24. In this condition, the stem sealing member 86 may safely be removed and replaced during maintenance.

In accordance with the preferred embodiment of the present invention, the size of the valve body 12 is minimized in order to reduce the cost and weight of the gate valve 10. As seen in FIGS. 2 and 3, the minimum cross sectional area of the upper chamber 26 of the gate cavity in a plane perpendicular to the valve stem 68 is generally restricted by the size of the bonnet 30. However, the cross sectional area of the lower chamber 28 of the gate cavity in a plane perpendicular to the valve stem need only be large enough to accommodate the gate 94. Therefore, the cross sectional area of the lower chamber 28 is made smaller than the cross sectional area of the upper chamber 26, and the central portion 22 of the valve body 12 is accordingly reduced to a size just large enough to accommodate the upper and lower chambers. This greatly reduces the amount of material required to manufacture the valve body. Moreover, the relatively small gate cavity reduces the severe blow down problems typically encountered in gate valves as the gate is initially opened.

Referring again to FIGS. 2 and 3, the body 12 of the gate valve 10 can be seen to comprise an outer wall 124 which encloses the flow passage 14 and the gate cavity 24. In accordance with another embodiment of the invention, the thickness of the wall 124 between the flanges 20 and the portion of the body 12 which interfaces with the bonnet 30 is approximately uniform. Thus, during casting of the body 12, when the casting inflow ports are located at the bonnet interface and the casting outflow ports are located at the flanges, the uniform thickness of the wall 124 results in improved casting flow and thereby reduces the amount of strands occurring in the body 12. In addition, the thickness of wall 124 minimizes the amount of metal required for the body.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. A gate valve comprising:
   a valve body having an internal flow passage which extends between an inlet port and an outlet port;
   a pair of seats mounted in respective seat pockets formed in the body coaxial with the flow passage;
   a gate disposed between the seats and having a transverse opening therethrough;
   a valve stem threadedly connected to the gate;
   wherein rotation of the valve stem raises or lowers the gate to bring the opening into or out of alignment with the flow passage to either open or close the gate valve, respectively;
   wherein each seat comprises a generally cylindrical body portion having a substantially uniform outer diameter and first and second end faces which are adapted to seal with the gate;
   whereby each seat may be mounted in its seat pocket with either the first face or the second face adjacent the gate;
   wherein each seat further comprises first and second annular grooves formed on the outer diameter of the body portion, and wherein only one of the grooves is positioned within the seat pocket when the seat is mounted in the seat pocket;
   a gate cavity extending through the valve body and intersecting the flow passage;
   a bonnet connected to the valve body over the gate cavity, the bonnet having a bore extending therethrough which communicates with the gate cavity;
   a bonnet cap secured to the bonnet over the bore;
   the valve stem comprising a first portion which is rotationally supported in the bonnet cap and a second portion which extends through the bore in the bonnet and into the gate cavity;
   a bearing support ring rotationally received within the bonnet cap, the bearing support ring including first and second axial ends and an axial bore through which the first portion of the valve stem is inserted;
   a bearing pin positioned in corresponding holes in the bearing support ring and the valve stem to connect the bearing support ring to the valve stem; and
   a first thrust bearing washer disposed between the bonnet cap and the first axial end of the bearing support ring.

2. The gate valve of claim 1, wherein the first thrust bearing washer is constructed of a non-metallic material.

3. The gate valve of claim 1, further comprising:
   a second thrust bearing washer disposed between the bonnet and the second axial end of the bearing support ring.

4. The gate valve of claim 3, wherein the first and second thrust bearing washers are constructed of a non-metallic material.

5. The gate valve of claim 1, further comprising a single lip seal disposed between the valve stem and the bore of the bonnet.

6. The gate valve of claim 5, wherein the lip seal is comprised of a non-metallic material.

7. The gate valve of claim 6, wherein the lip seal comprises a first annular sealing lip for engaging the valve stem, a second annular sealing lip for engaging the bore, and a metallic spring member for urging the first and second sealing lips into engagement with the valve stem and the bore, respectively.

8. The gate valve of claim 5, wherein the valve stem comprises a reduced diameter notch formed in a portion of the valve stem above the lip seal, whereby the valve stem will fail at the notch under an applied maximum torque.

9. A gate valve comprising:
   a valve body having an internal flow passage which extends between an inlet port and an outlet port;
   a pair of seats mounted in respective seat pockets formed in the body coaxial with the flow passage;
   a gate disposed between the seats and having a transverse opening therethrough;
   a valve stem threadedly connected to the gate;
   wherein rotation of the valve stem raises or lowers the gate to bring the opening into or out of alignment with the flow passage to either open or close the gate valve, respectively;
   wherein each seat comprises a generally cylindrical body portion having a substantially uniform outer diameter and first and second end faces which are adapted to seal with the gate;
   whereby each seat may be mounted in its seat pocket with either the first face or the second face adjacent the gate;
   wherein each seat further comprises first and second annular grooves formed on the outer diameter of the body portion, and wherein only one of the grooves is positioned within the seat pocket when the seat is mounted in the seat pocket;
   a gate cavity extending through the valve body and intersecting the flow passage;
   a bonnet connected to the valve body over the gate cavity, the bonnet having a bore extending therethrough which communicates with the gate cavity;

a bonnet cap secured to the bonnet over the bore;

the valve stem comprising a first portion which is rotationally supported in the bonnet cap and a second portion which extends through the bore in the bonnet and into the gate cavity;

a "V" thread formed on the second portion of the valve stem; and a corresponding "V" thread formed in a longitudinal hole extending into the gate from a top surface thereof;

wherein when the second portion of the valve stem is threaded into the longitudinal hole, the "V" threads form a threaded interface between the valve stem and the gate which converts rotation of the valve stem into translation of the gate; and wherein the threaded interface is sufficiently loose to allow the gate to move laterally and contact a seat when the gate valve is in the closed position.

10. A gate valve comprising:

a valve body having an internal flow passage which extends between an inlet port and an outlet port;

a pair of seats mounted in respective seat pockets formed in the body coaxial with the flow passage;

a gate disposed between the seats and having a transverse opening therethrough;

a valve stem threadedly connected to the gate;

wherein rotation of the valve stem raises or lowers the gate to bring the opening into or out of alignment with the flow passage to either open or close the gate valve, respectively;

wherein each seat comprises a generally cylindrical body portion having a substantially uniform outer diameter and first and second end faces which are adapted to seal with the gate;

whereby each seat may be mounted in its seat pocket with either the first face or the second face adjacent the gate;

wherein each seat further comprises first and second annular grooves formed on the outer diameter of the body portion, and wherein only one of the grooves is positioned within the seat pocket when the seat is mounted in the seat pocket;

a gate cavity extending through the valve body and intersecting the flow passage;

a bonnet connected to the valve body over the gate cavity, the bonnet having a bore extending therethrough which communicates with the gate cavity;

a bonnet cap secured to the bonnet over the bore;

the valve stem comprising a first portion which is rotationally supported in the bonnet cap and a second portion which extends through the bore in the bonnet and Into the gate cavity;

a "V" thread formed on the second portion of the valve stem; and an insert mounted in a longitudinal hole extending into the gate from a top surface thereof, the insert comprising a through bore having "V" threads formed therein;

wherein when the second portion of the valve stem is threaded into the insert, the "V" threads form a threaded interface between the valve stem and the gate which converts rotation of the valve stem into translation of the gate.

11. A gate valve comprising:

a valve body having an internal flow passage which extends between an inlet port and an outlet port and a gate cavity which extends through the valve body and intersects the flow passage;

a bonnet connected to the valve body over the gate cavity, the bonnet having a bore extending therethrough which communicates with the gate cavity;

a bonnet cap secured to the bonnet over the bore;

a valve stem comprising a first portion which is rotationally supported in the bonnet cap and a second portion which extends through the bore and into the gate cavity;

a pair of seats mounted in the body coaxial with the flow passage;

a gate disposed between the seats and having a transverse opening therethrough, the gate being threadedly connected to the second portion of the valve stem;

wherein rotation of the valve stem raises or lowers the gate to bring the opening into or out of alignment with the flow passage to either open or close the gate valve, respectively;

a bearing support ring rotationally received within the bonnet cap, the bearing support ring including first and second axial ends and an axial bore through which the first portion of the valve stem is inserted;

a bearing pin positioned in corresponding holes in the bearing support ring and the valve stem to connect the bearing support ring to the valve stem; and a first thrust bearing washer disposed between the bonnet cap and the first axial end of the bearing support ring.

12. The gate valve of claim 11, wherein the first thrust bearing washer is constructed of a non-metallic material.

13. The gate valve of claim 11, further comprising:

a second thrust bearing washer disposed between the bonnet and the second axial end of the bearing support ring.

14. The gate valve of claim 13, wherein the first and second thrust bearing washers are constructed of a non-metallic material.

15. A gate valve comprising:

a valve body having an internal flow passage which extends between an inlet port and an outlet port and a gate cavity which extends through the valve body and intersects the flow passage;

a bonnet connected to the valve body over the gate cavity, the bonnet having a bore extending therethrough which communicates with the gate cavity;

a bonnet cap secured to the bonnet over the bore;

a valve stem comprising a first portion which is rotationally supported in the bonnet cap and a second portion which extends through the bore and into the gate cavity;

a pair of seats mounted in the body coaxial with the flow passage;

a gate disposed between the seats, the gate having a transverse opening therethrough and a longitudinal hole extending into the gate from a top surface thereof;

a "V" thread formed on the second portion of the valve stem;

a "V" thread formed in at least a portion of the longitudinal hole;

wherein the second portion of the valve stem is threaded into the longitudinal hole to create a "V" thread interface between the valve stem and the gate which converts rotation of the valve stem into translation of the gate;

wherein rotation of the valve stem raises or lowers the gate to bring the opening into or out of alignment with the flow passage to either open or close the gate valve, respectively; and wherein the "V" thread interface is sufficiently loose to allow the gate to move laterally and contact a seat when the gate valve is in the closed position.

16. A gate valve comprising:

a valve body having an internal flow passage which extends between an inlet port and an outlet port and a gate cavity which extends through the valve body and intersects the flow passage;

a bonnet connected to the valve body over the gate cavity, the bonnet having a bore extending therethrough which communicates with the gate cavity;

a bonnet cap secured to the bonnet over the bore;

a valve stem comprising a first portion which is rotationally supported in the bonnet cap and a second portion which extends into the gate cavity;

a pair of seats mounted in the body coaxial with the flow passage;

a gate disposed between the seats, the gate having a transverse opening therethrough and a longitudinal hole extending into the gate from a top surface thereof;

a "V" thread formed on the second portion of the valve stem;

an insert mounted in the longitudinal hole, the insert comprising a through bore having a "V" thread formed therein;

wherein the second portion of the valve stem is threaded into the insert to create a "V" thread interface between the valve stem and the gate which converts rotation of the valve stem into translation of the gate;

wherein rotation of the valve stem raises or lowers the gate to bring the opening into or out of alignment with the flow passage to either open or close the gate valve, respectively.

17. The gate valve of claim 16, wherein the insert is a threaded insert.

18. The gate valve of claim 16, wherein the insert is a spring bushing.

* * * * *